United States Patent
Lim et al.

(10) Patent No.: US 9,515,800 B2
(45) Date of Patent: Dec. 6, 2016

(54) METHOD FOR TRANSMITTING AND RECEIVING FEEDBACK INFORMATION ON D2D TRANSMISSION DATA IN WIRELESS COMMUNICATION SYSTEM FOR SUPPORTING D2D COMMUNICATION AND APPARATUS THEREFOR

(71) Applicant: LG ELECTRONICS INC., Seoul (KR)

(72) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

(21) Appl. No.: 14/375,737

(22) PCT Filed: Jan. 30, 2013

(86) PCT No.: PCT/KR2013/000769
§ 371 (c)(1),
(2) Date: Jul. 30, 2014

(87) PCT Pub. No.: WO2013/115567
PCT Pub. Date: Aug. 8, 2013

(65) Prior Publication Data
US 2015/0023267 A1 Jan. 22, 2015

Related U.S. Application Data

(60) Provisional application No. 61/592,007, filed on Jan. 30, 2012.

(51) Int. Cl.
*H04W 4/00* (2009.01)
*H04L 5/00* (2006.01)
(Continued)

(52) U.S. Cl.
CPC ........... *H04L 5/0055* (2013.01); *H04L 1/1854* (2013.01); *H04W 72/0406* (2013.01)

(58) Field of Classification Search
CPC .................................................. H04W 28/04
(Continued)

(56) References Cited

U.S. PATENT DOCUMENTS

2011/0317569 A1* 12/2011 Kneckt ............ H04W 74/0833
370/252

FOREIGN PATENT DOCUMENTS

KR  10-2009-0003946  1/2009
KR  10-2011-0033079  3/2011
(Continued)

OTHER PUBLICATIONS

PCT International Application No. PCT/KR2013/000769, Written Opinion of the International Searching Authority dated May 15, 2013, 1 page.

*Primary Examiner* — Christopher R Crompton
(74) *Attorney, Agent, or Firm* — Lee, Hong, Degerman, Kang & Waimey

(57) ABSTRACT

A method for transmitting feedback information on device to device (D2D) transmission data in a wireless communication system for supporting D2D communication according to the present invention comprises the steps of: informing a D2D link with another D2D terminal through a D2D terminal search; enabling a first D2D terminal to receive, in the formed D2D link, D2D information including resource allocation information for transmitting D2D data from a base station; enabling the first D2D terminal to receive data from a linked second D2D terminal through a resource according to the resource allocation information; and transmitting, to the base station, feedback information including acknowledgement/non-acknowledgement (ACK/NACK)

(Continued)

signals for the received data, wherein the feedback information can comprise a D2D indicator for indicating the information related to the D2D communication and the identification information of the first D2D terminal and/or the identification information of the second D2D terminal.

5 Claims, 6 Drawing Sheets

(51) Int. Cl.
*H04L 1/18* (2006.01)
*H04W 72/04* (2009.01)

(58) Field of Classification Search
USPC .......................................................... 370/329
See application file for complete search history.

(56) References Cited

FOREIGN PATENT DOCUMENTS

| | | |
|---|---|---|
| KR | 10-2011-0086758 | 7/2011 |
| WO | 2006/070300 | 7/2006 |

* cited by examiner

METHOD FOR TRANSMITTING AND RECEIVING FEEDBACK INFORMATION ON D2D TRANSMISSION DATA IN WIRELESS COMMUNICATION SYSTEM FOR SUPPORTING D2D COMMUNICATION AND APPARATUS THEREFOR

CROSS-REFERENCE TO RELATED APPLICATIONS

This application is the National Stage filing under 35 U.S.C. 371 of International Application No. PCT/KR2013/000769, filed on Jan. 30, 2013, which claims the benefit of U.S. Provisional Application Ser. No. 61/592,007, filed on Jan. 30, 2012, the contents of which are hereby incorporated by reference herein in their entirety.

TECHNICAL FIELD

The present invention relates to a wireless communication, and more particularly, to a method of performing or supporting a D2D (device to device) communication in a wireless communication system and apparatus therefor.

BACKGROUND ART

Recently, as smartphones and tablet PCs are widely used and multimedia communications of high capacity are activated, mobile traffic increases rapidly. The increasing tendency of the mobile traffic in the future is expected to increase about twice each year. Since most of the mobile traffic is transmitted through a base station, communication service providers are currently confronted with serious network overloads. In order to handle the increasing traffic, the communication service providers increase network equipment investment and commercialize the next generation mobile communication standards (e.g., WiMAX, LTE (long term evolution), etc.) for efficiently handling lots of traffic in a hurry. Yet, in order to bear the amount of traffic expected to increase further rapidly, it is time to seek for other solutions.

D2D (device-to device) communication is a distributive communication technology for directly delivering traffic between adjacent nodes without using such an infrastructure as a base station. In D2D communication environment, each node such as a mobile terminal and the like searches for another user equipment physically adjacent to the corresponding node by itself, establishes a communication session, and then transmits traffic. Thus, since the D2D communication can solve the traffic overload problem in a manner of distributing the traffic focused on a base station, the D2D communication is spotlighted as an elementary technology of the post 4G next generation mobile communication. Such a standardization organization as 3GPP, IEEE and the like is promoting D2D communication standard enactment based on LTE-A or Wi-Fi. And, such a company as Qualcomm and the like is developing an independent D2D communication technology.

D2D communication is expected to create new communication services as well as to contribute to increase performance of a mobile communication system. And, the D2D communication can support adjacency based social network services or such a service as a network game and the like. If a D2D link is utilized as a relay, it is able to solve the problem of connectivity of a user equipment in a radio shadow area. Thus, the D2D technology is expected to provide new services in various fields.

Actually, D2D communication technologies including IR (infrared ray) communication, Zigbee, RFID (radio frequency identification), NFC (near field communications) based thereon are widely used nowadays. Yet, since these technologies can support communications for special purposes within a very limited distance only, it may be difficult to exactly categorize these technologies into the D2D communication technologies for distributing traffic of a base station.

So far, the D2D communication is described. However, a procedure for transmitting ACK/NACK signal for a data transmission between D2D user equipments to perform an efficient D2D communication on a cellular network and a method of transmitting ACK/NACK on D2D data transmission of transmission resource information and the like have not been proposed yet.

DISCLOSURE OF THE INVENTION

Technical Tasks

One object of the present invention is to provide a method of transmitting a feedback information on D2D transmission data in a wireless communication system supportive of D2D (device to device) communication.

Another object of the present invention is to provide a method for a base station to transmit a feedback information on D2D transmission data in a wireless communication system supportive of D2D (device to device) communication.

Further object of the present invention is to provide a D2D user equipment for transmitting a feedback information on D2D transmission data in a wireless communication system supportive of D2D (device to device) communication.

Another further object of the present invention is to provide a base station for transmitting a feedback information on D2D transmission data in a wireless communication system supportive of D2D (device to device) communication.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting feedback information for D2D transmission data in a wireless communication system supportive of a D2D (device to device) communication may include establishing a D2D link with a different D2D user equipment through a D2D user equipment discovery, receiving, by a first D2D user equipment from a base station, D2D information including a resource allocation information for a D2D data transmission in the established D2D link, receiving, by the first D2D user equipment from a second D2D user equipment, data through a resource according to the resource allocation information, the second D2D user equipment is D2D-linked with the first D2D user equipment, and transmitting feedback information including an ACK/NACK (acknowledgement/non-acknowledgement) signal for the received data to the base station, wherein the feedback information comprises at least one of a D2D indicator indicating that the feedback information is related to the D2D communication and identifier information of the first and second D2D user equipments.

The D2D indicator may be transmitted on an uplink control channel and the ACK/NACK signal may be transmitted on an uplink data channel corresponding to the uplink control channel. The D2D indicator and the ACK/NACK signal may be transmitted on an uplink control channel. The uplink control channel may be a D2D dedicated uplink control channel. The identifier information of the first and second D2D user equipments may include identifiers of the first and second D2D user equipments, a D2D link identifier of the first and $2^{nd}$ D2D user equipments, or a group identifier of the first and $2^{nd}$ D2D user equipments.

To further achieve these and other advantages and in accordance with the purpose of the present invention, as embodied and broadly described, a method of transmitting a feedback for D2D transmission data by a base station in a wireless communication system supportive of a D2D (device to device) communication, may include receiving feedback information including an ACK/NACK (acknowledgement/non-acknowledgement) signal for data, which is received by a first D2D user equipment from a D2D-linked second D2D user equipment, from the D2D-linked first D2D user equipment and transmitting the received feedback information to the second D2D user equipment, wherein the feedback information includes at least one of a D2D indicator indicating that the feedback information is related to the D2D communication and identifier information of the first and second D2D user equipments.

The D2D indicator and the ACK/NACK signal included in the feedback information transmitted by the base station may be transmitted on a downlink control channel and a downlink data channel corresponding to the downlink control channel, respectively. The D2D indicator and the ACK/NACK signal included in the feedback information transmitted by the base station may be transmitted on a downlink control channel. The ACK/NACK signal included in the feedback information transmitted by the base station may be transmitted on one of a D2D dedicated downlink control channel and a downlink HARQ (hybrid automatic retransmit request) channel. The ACK signal may be transmitted as an indicator indicating a new data transmission and the NACK signal may be transmitted as an indicator indicating a retransmission of the data. The downlink HARQ channel may be a PHICH (physical hybrid ARQ indicator channel) and the ACK/NACK signal included in the feedback information transmitted by the base station may be transmitted through a second symbol of a first slot of the PHICH. The downlink HARQ channel may be a D2D dedicated PHICH (physical hybrid ARQ indicator channel) and the ACK/NACK signal included in the feedback information transmitted by the base station may be transmitted on the D2D dedicated PHICH.

To further achieve these and other advantages and in accordance with the purpose of the present invention, as embodied and broadly described, a first D2D (device to device) user equipment of transmitting feedback information on a D2D transmission data in a wireless communication system supportive of a D2D (device to device) communication, a D2D user equipment may include a transmitter, a receiver, and a processor configured to establish a D2D link with a different D2D user equipment through a D2D user equipment discovery, wherein the processor is further configured to control that the receiver receives a D2D information including a resource allocation information for a D2D data transmission from a base station in the established D2D link and receives data from a D2D-linked $2^{nd}$ D2D user equipment through a resource according to the resource allocation information, the processor is further configured to control the transmitter transmits the feedback information including an ACK/NACK (acknowledgement/non-acknowledgement) signal for the received data to the base station, wherein the feedback information may include at least one of a D2D indicator indicating that the feedback information is related to the D2D communication and identifier information of the first and second D2D user equipments.

To further achieve these and other advantages and in accordance with the purpose of the present invention, as embodied and broadly described, a base station of transmitting feedback information on a D2D transmission data in a wireless communication system supportive of a D2D (device to device) communication, a base station may include a transmitter, a receiver, and a processor is configured to control the receiver receives the feedback information including an ACK/NACK (acknowledgement/non-acknowledgement) signal for data, which is received by a first D2D user equipment from a D2D-linked second D2D user equipment, from the D2D-linked first D2D user equipment, the processor is further configured to control the transmitter transmits the received feedback information to the second D2D user equipment, wherein the feedback information may include at least one of a D2D indicator indicating that the feedback information is related to the D2D communication and identifier information of the $1^{st}$ and $2^{nd}$ D2D user equipments.

Advantageous Effects

According to various embodiments of the present invention, as HARQ ACK/NACK signal on a data transmission between D2D user equipments is efficiently transmitted, communication performance can be remarkably enhanced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
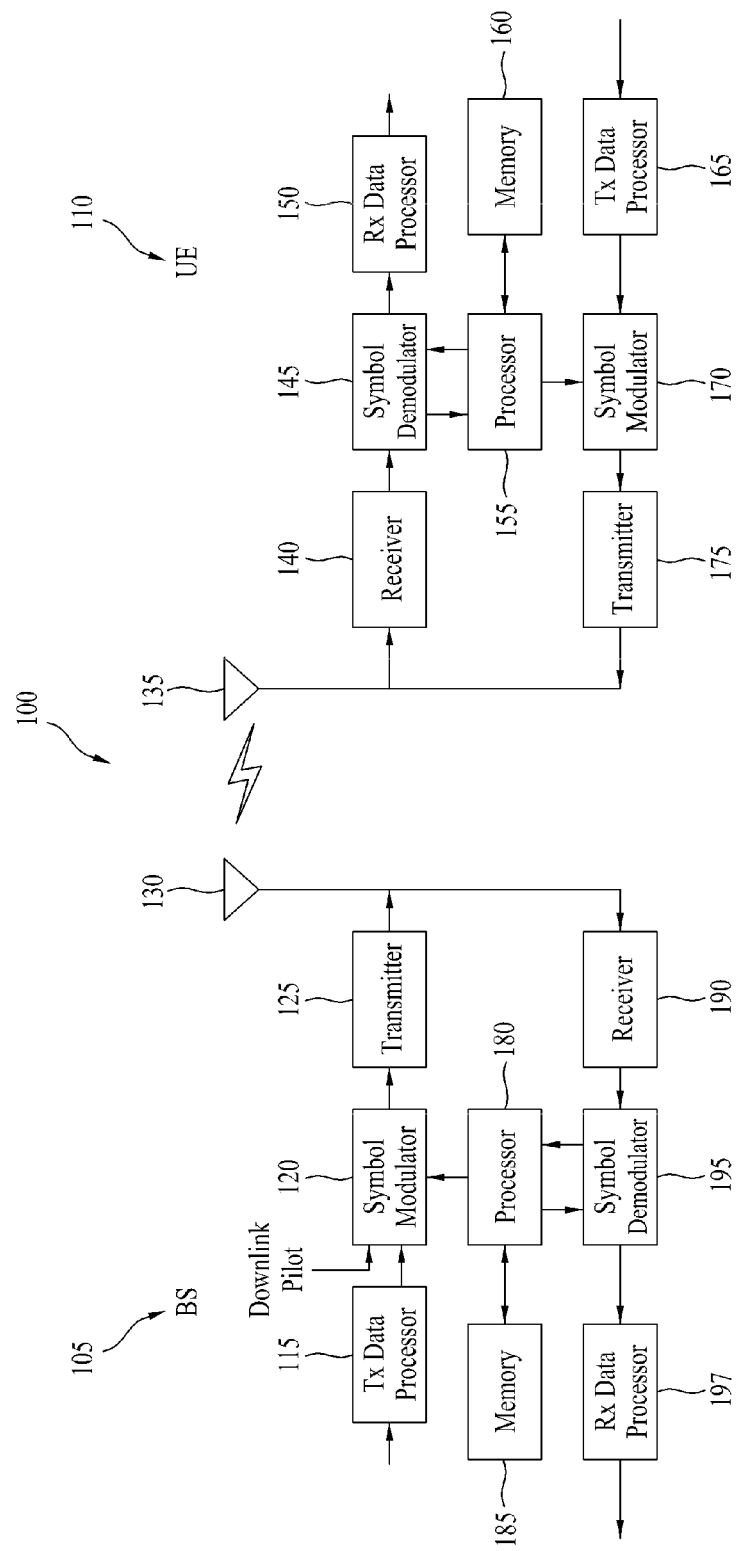
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

Although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A user equipment and a base station may be able to exchange RRC messages with each other through a wireless communication network and RRC layers.

Generally, in order to perform a communication, a cellular user equipment located in a cell of a cellular network or communication accesses a base station, receives control information for exchanging data with the base station, and is then able to exchange the data with the base station. In particular, since a cellular user equipment transceives data through a base station, in order for one cellular user equipment to transmit data to another cellular user equipment, the former cellular user equipment transmits its data to the base station and the base station having received the data then transmits the received data to the latter cellular user equipment. Thus, in order for one cellular user equipment to transmit data to another cellular user equipment, since the former cellular user equipment can transmit the data through the base station only, the base station performs scheduling on a channel and resource for the data transceiving and should transmit the scheduled information to each of the cellular user equipments. Thus, in order to perform a communication between cellular user equipments through a base station, channel and resource allocation for transceiving data with a base station is required.

Yet, a direct communication between user equipments (i.e., a device-to-device communication (hereinafter abbreviated a D2D communication) is configured to directly transceive a signal with a user equipment, to which data will be transmitted, without using a base station or a relay node. Hence, it is necessary to design a channel and resource structure to enable a signal to be transceived without being controlled by a base station. In designing such a channel and resource structure, when a D2D user equipment is working on a cellular network, the D2D user equipment needs to be designed to avoid collisions of channels and allocated resources for a legacy cellular user equipment. In the present specification, a D2D user equipment may mean a user equipment that performs or supports a D2D communication. And, the D2D user equipment may be used as conceptionally including a mobile terminal supportive of a D2D communication.

Figure 2:
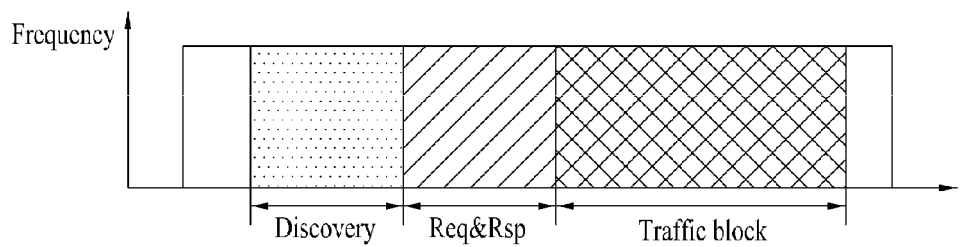
FIG. 2 is a diagram for one example of a frame structure for D2D communication.

FIG. 2 is a diagram for one example of a frame structure for D2D communication.

First of all, a D2D communication is performed using a frame structure shown in FIG. 2. And, a frame shown in FIG. 2 may include a discovery interval, a request & response (Req and Rsp) interval and a traffic block interval. A user equipment (hereinafter named a D2D user equipment), which is capable of performing a D2D communication or performs a D2D communication, is able to determine a presence or non-presence of D2D user equipments nearby through the discovery interval.

In order to perform a D2D communication, a D2D user equipment can perform such an operation as a transmission/reception of a transmission (Tx) request signal, a D2D request transmission to a base station, a reception of resource allocation (RA) information and the like through the request & response interval. Names or titles of the respective intervals shown in FIG. 2 are just exemplary and can be replaced by other names. Unlike FIG. 2, an operation area for a D2D user equipment can be defined in a manner of being discriminated not by time but by frequency.

A D2D user equipment is able to receive information (e.g., an interval length (e.g., a discovery interval length, a request & response interval length, etc.), a period, an information on the number of symbols/slots/subframe, a start point information (e.g., an information on an index of symbol/slot/subframe, etc.), etc.) on the frame structure for the D2D communication from a base station on a broadcast channel (e.g., a physical broadcasting channel (PBCH), etc.) or a control channel (e.g., a physical downlink control channel (PDCCH), etc.).

In order to obtain neighbor D2D user equipments, a D2D user equipment performs a D2D discovery before performing a D2D communication. For the discovery, the D2D user equipment mainly performs two kinds of operations. According to a $1^{st}$ operation, the D2D user equipment receives discovery signals transmitted through broadcast signals by other D2D user equipments nearby the corresponding D2D user equipment and then obtains identifier information on the D2D user equipments from the received signals. Hence, the D2D user equipment is able to recognize a presence or non-presence of other D2D user equipments nearby. According to a $2^{nd}$ operation, the D2D user equipment broadcasts its identifier information through a discovery signal, thereby performing an operation of notifying its presence to nearby D2D user equipments. In doing so, it is able to transmit the broadcasted discovery signal using a resource (i.e., a vacant resource) in a broadcast channel unused by other D2D user equipments to transmit a discovery signal.

D2D Link Establishment

A transmitting D2D user equipment transmits a transmission request signal to a receiving D2D user equipment to perform a D2D communication. In this case, the receiving D2D user equipment makes a list by performing measurements on transmission request signals received from transmitting D2D user equipments. As the receiving D2D user equipment transmits the list to a base station, the base station is able to obtain an information on the receiving D2D user equipment desired by the transmitting D2D user equipment to perform the D2D communication, i.e., an information on a destination of the D2D communication or an information on a D2D link of the D2D communication, from the received list.

The base station is able to obtain information (e.g., identifier, QoS, transmission power level, etc.) on the transmitting D2D user equipments desired to perform the D2D communications with the receiving D2D user equipment and information on a received signal strength between the receiving D2D user equipment and each of the transmitting D2D user equipments. Based on the obtained informations, the base station can configure (or determine) the transmitting D2D user equipment to perform the D2D communication with the receiving D2D user equipment with the received signal strength and the QoS.

For instance, if transmitting D2D user equipments desiring to perform D2D communications with a receiving D2D user equipment 1 include a transmitting D2D user equipment 1 and a transmitting D2D user equipment 3, when a signal strength level and a QoS level received from the transmitting D2D user equipment 1 are 5 and 7 and a signal strength level and a QoS level received from the transmitting D2D user equipment 3 are 3 and 4, the base station compares the QoS levels and the received signal strength strengths transmitted by the transmitting D2D user equipments. In this case, regarding the signal strength between of the two user equipments, although the signal strength between the transmitting D2D user equipment 1 and the receiving D2D user equipment 1 is better but the link has difficult in meeting a requested QoS level (i.e., 7), it is able to select a connection between the transmitting D2D user equipment 3 and the receiving D2D user equipment 1, which can meet the QoS level, as a D2D link.

Thus, the base station selects a transmitting D2D user equipment, which will transmit data to a receiving D2D user equipment through a D2D communication, and is able to indicate the selection to the configured D2D pair (i.e., the transmitting D2D user equipment and the receiving D2D user equipment).

After a D2D link has been established, if a D2D user equipment transmits data to another D2D user equipment in a cell through a D2D transmission within a cellular network, the present invention proposes a method of transmitting an acknowledgement/non-acknowledgement (ACK/NACK) signal for the data transmission between the D2D user equipments, a method of transmitting an ACK/NACK signal for the D2D link, and a control channel for the same.

In the following description, user equipments configured to perform a D2D communication are sorted into a source D2D user equipment configured to transmit data to another D2D user equipment and a target D2D user equipment configured to receive data from other D2D user equipments. Each of two D2D user equipments (i.e., a source D2D user equipment and a target D2D user equipment) configured to perform a D2D communication accesses a base station and then receives information on a cellular network and information for a D2D operation (or management) through a downlink control channel (e.g., a physical broadcast channel (PBCH) in 3GPP LTE system, a physical downlink control channel (PDCCH) in 3GPP LTE system, a physical hybrid ARQ indicator channel (PHICH) in 3GPP LTE system, a physical control format indicator channel (PCFICH) in 3GPP LTE system, A-MAP in IEEE 802.16 system, etc.) from the base station. Hence, each of the source and target D2D user equipments performing the D2D communication within the cellular network is able to transmit data on a resource allocated using the D2D information obtained from the control channel transmitted from the base station. Thus, having the data transmitted by the source D2D user equipment through the D2D link, the target D2D user equipment transmits an ACK/NACK signal for the received data, thereby notifying that the data transmitted by the source D2D user equipment has been received well without error and making a request for a new data transmission. On the other hand, the target D2D user equipment may be able to make a request for a retransmission by notifying that the data reception has not been performed well due to error. In doing so, a method of transmitting ACK/NACK for a D2D transmission may be mainly classified into a base station supportive ACK/NACK transmission scheme or a direct ACK/NACK transmission scheme between D2D user equipments.

Base Station Supportive ACK/NACK Transmission Scheme for D2D Link

Figure 3:
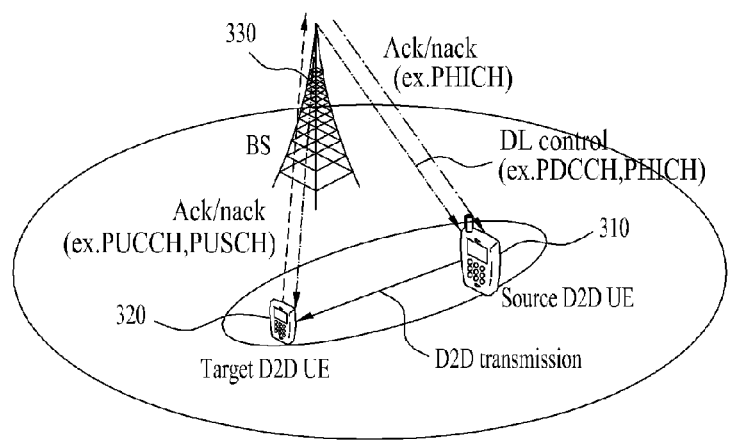
FIG. 3 is a diagram for the concept of a base station supportive ACK/NACK transmission scheme for a D2D link.

FIG. 3 is a diagram for the concept of a base station supportive ACK/NACK transmission scheme for a D2D link.

Assume that a D2D link is established between D2D user equipments 310 and 320 in a cellular network. Each of the D2D user equipments 310 and 320 receives information on D2D from a base station 330. In particular, a source D2D user equipment 310 is able to transmit data to another D2D user equipment 320 (i.e., a target D2D user equipment) using the received D2D information. In doing so, having received data through a D2D communication, the target D2D user equipment 320 transmits an ACK/NACK signal for the received data to the base station 330.

Having received the ACK/NACK signal for the data transmission from the target D2D user equipment 320, the base station 330 transmits the ACK/NACK information to the source D2D user equipment 310. The source D2D user equipment 310 receives an ACK/NACK signal for the data transmission from the base station 330, determines a retransmission for the D2D link or a new data transmission, and is then able to perform the D2D communication for the new data transmission or the retransmission.

Like the example shown in FIG. 3, each of the source and target D2D user equipments 310 and 320 performing the D2D communication on the cellular network can receive the D2D information from the base station 330 through a downlink channel. In doing so, the D2D information transmitted for the D2D by the base station 330 can be transmitted on a dedicate channel for the D2D user equipments 310 and 320 or a channel previously used on the cellular network. Hence, it is able to transmit an ACK/NACK signal for a D2D transmission through a D2D dedicated channel or an existing channel.

Figure 4:
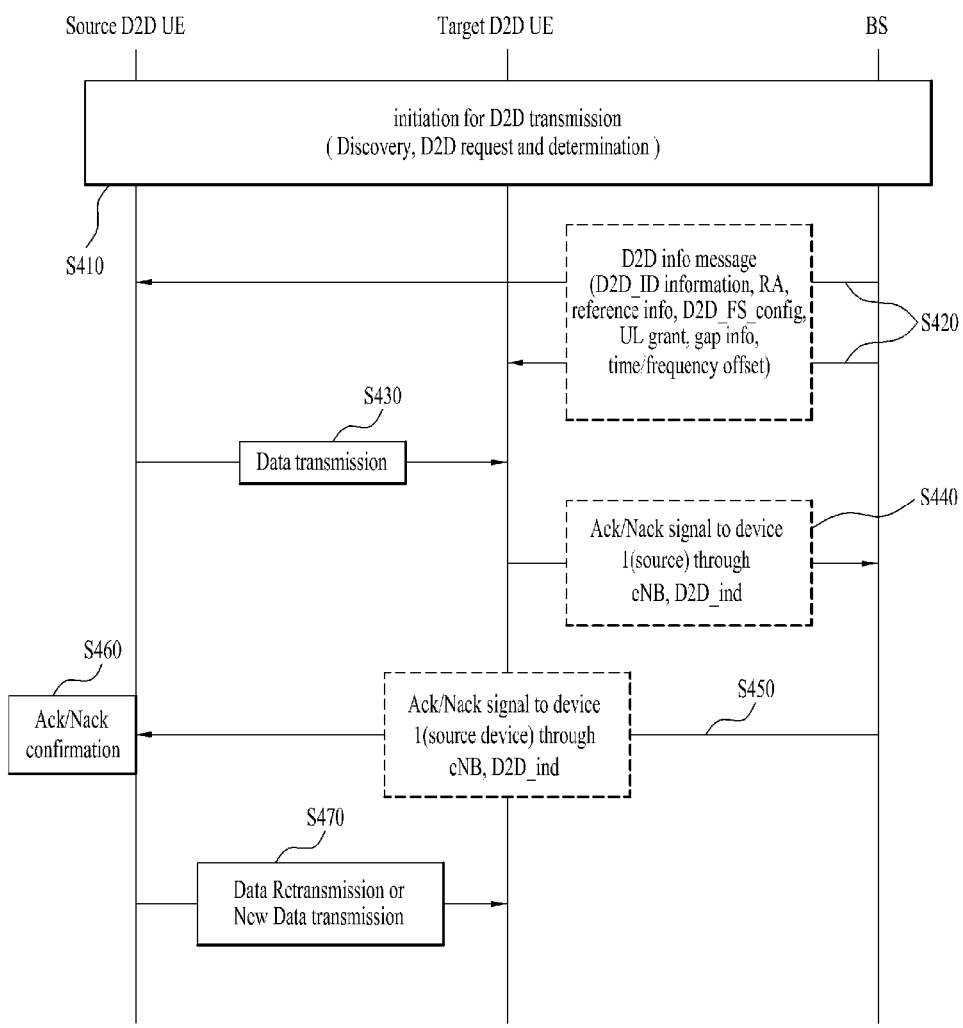
FIG. 4 is a flowchart to describe an ACK/NACK transmitting method in a D2D link.

FIG. 4 is a flowchart to describe an ACK/NACK transmitting method in a D2D link.

Referring to FIG. 4, each D2D user equipment performing a D2D communication in a cellular network recognizes other D2D user equipments nearby through a discovery. A D2D user equipment desiring a D2D transmission determines whether to perform the D2D communication in a manner of transmitting a request signal to another D2D user equipment or a base station and then receiving a response message from the corresponding D2D user equipment or the base station in response to the request signal.

Thus, having performed the initiation for the D2D communication on the cellular network, the D2D user equipment receives information required for performing the D2D from the base station [S410]. The base station transmits D2D information (D2D info message) to the D2D user equipments (i.e., a source D2D user equipment and a target D2D user equipment) performing the D2D [S420].

In this case, the D2D information may include at least one of D2D related informations such as identifiers (IDs) of the source and target D2D user equipments, a D2D identifier (e.g., a D2D user equipment grouping ID, a D2D user equipment pairing ID, a D2D link ID, etc.), a resource allocation information for the D2D communication, a reference information (reference info) (e.g., a sequence index, a cyclic shift value, a length (e.g., a reference sequence length), a D2D frame configuration information (D2D_FS_config), a UL grant, a gap information, a time/frequency offset and the like.

In this case, since each of the D2D frame configuration information and the gap information for the D2D communication in the D2D information corresponds to an information having a less change, it can be transmitted to D2D user equipments in a cell through a broadcast channel (e.g., a superframe header or MAP in 16m system, PBCH in LTE system, etc.) in order to reduce a load on a control channel. A downlink control channel for transmitting the D2D information to the D2D user equipments can be configured in a manner as follows.

First of all, a base station transmits D2D information to a source D2D user equipment and a target D2D user equipment using a downlink channel transmitted by the base station in a cellular network. For instance, information on a D2D transmission is transmitted using A-MAP (advanced-MAP) in 16m system, PDCCH in LTE system or ePDCCH (evolved PDCCH) in LTE-A system, or a channel can be extended to use in order to add the D2D information to the channel. In order only for the D2D user equipment to receive the D2D information transmitted on the above-mentioned channel, the D2D information can be transmitted in a manner of being configured to be detected with D2D ID (e.g., a D2D user equipment grouping ID, a D2D user equipment pairing ID, a D2D link ID, etc.) or D2D user equipment ID. Moreover, in case that a D2D user equipment performs a D2D communication to reduce a load on a control channel unlike transmitting D2D information through the control channel, a base station can transmit the D2D information to each D2D user equipment through a data channel (e.g., a physical downlink shared channel (PDSCH) in LTE system). Alternatively, the base station is able to notify information, which indicates that the D2D information is transmitted on a data channel, to D2D user equipments through a control channel (e.g., a D2D PDCCH (D2D_PDCCH)).

Meanwhile, in order to transmit D2D information to a D2D user equipment performing an intra-cell D2D communication, a base station configures a D2D dedicated channel and is then able to transmit a related information to D2D user equipments through the D2D dedicated channel. In this case, the D2D dedicated channel can be configured with a common channel or a UE-specific channel (or a user specific channel). In case of the transmission on the common channel, the base station transmits information (e.g., a presence or non-presence of the D2D common channel, a start point (denoted by a time/frequency index or the like) of the D2D common channel, a length of the D2D common channel, etc.) on the D2D common channel to an intra-cell D2D user equipment through a broadcast channel (e.g., a superframe header in 16m system, MAP in 16m system, PDCH in LTE system, etc.). Moreover, the information transmitted on the D2D common channel may be transmitted in a manner of being masked with a D2D user equipment identifier, a D2D user equipment group ID (or a D2D pairing ID), or the like in order to be identified per D2D user equipment performing the D2D communication or per D2D user equipment pair performing the D2D communication. When the D2D information is transmitted on a UE-specific dedicated D2D channel, information on the UE-specific dedicated channel can be transmitted by the base station to D2D user equipments through an existing control channel (e.g., MAP in LTE system, PDCCH in LTE system, ePDCCH in LTE-A system, etc.). The D2D channel (e.g., D2D common channel, UE-specific D2D channel, etc.) used to transmit the D2D information can be used in a manner of being situated next to a channel used by the cellular network. In particular, the D2D channel can be used in a manner of being configured with a D2D PDCCH or PUCCH situated next to PDCCH or PUCCH used by a cellular network. Since the PDCCH or PUCCH is a control channel generally used for a communication with a base station, information on the D2D channel is transmitted to a D2D user equipment through the corresponding channel. Hence, the D2D user equipment can watch the control channel or the D2D user equipment performing the D2D communication can receive a control information through the corresponding channel Having received the D2D information through the corresponding channel, each of the D2D user equipments (i.e., source D2D user equipment and target D2D user equipment) receives a UL grant from the base station and then performs the D2D transmission. In doing so, the UL grant transmitted to the D2D user equipment by the base station may have the following features.

1. A base station can transmit resource allocation information for D2D transmission to a D2D user equipment performing a D2D communication using a UL grant.

2. A UL grant transmitted to a D2D user equipment by a base station may include a resource allocation information for a data transmission between D2D user equipments and a resource allocation information for a UL transmission from a D2D user equipment to a base station. In this case, since a resource allocation applied to the D2D user equipment by the base station is applied to a target D2D user equipment among the D2D user equipments performing the D2D communication, an indication information on the resource allocation can be transmitted in a manner of being contained in the UL grant or being masked with a target D2D identifier.

3. The UL grant may be transmitted in each frame. Alternatively, the UL grant may be transmitted for semi-persistence scheduling in each several frames or by prescribed periods. For persistence scheduling, the UL grant can be transmitted to D2D user equipments by a base station each time a new D2D transmission starts after an end of a D2D transmission. In order to notify the end of the D2D transmission to the base station, the D2D user equipment may be able to transmit a D2D transmission completion indicator.

Having received the D2D information from the base station, each of the source D2D user equipment and the target D2D user equipment transmits D2D data using the allocated resource [S430]. Having received the data from the source D2D user equipment through the allocated resource, the target D2D user equipment transmits a presence or non-presence of ACK/NACK for the received D2D data to the base station [S440]. The ACK/NACK signal for the D2D transmission, which is transmitted to the target D2D user equipment by the base station, can be transmitted through an uplink resource allocated through the UL grant by the base station. In the following description, a method of transmitting ACK/NACK signal for a D2D communication shall be explained in detail.

<Definition of New PUCCH Format for D2D ACK/NACK Transmission>

A target D2D user equipment is able to transmit an ACK/NACK signal for a D2D transmission data received from a source D2D user equipment through PUCCH (physical uplink control channel). To this end, it is able to define and use PUCCH format (PUCCH format 4) of a D2D type. The PUCCH format 4 for a D2D ACK/NACK transmission can include a D2D indicator (e.g., in the present specification, the D2D indicator means an indicator indicating ACK/NACK for the D2D transmission data) and an ACK/NACK signal. Moreover, the PUCCH format 4 may further include information on a source D2D identifier and a target D2D user equipment identifier in order to indicate that a transmission of the ACK/NACK signal is a transmission of a data, which is transmitted by a specific source D2D user equipment, from a specific target D2D user equipment.

<D2D ACK/NACK Transmission Using Existing PUCCH and PUSCH>

For the D2D ACK/NACK transmission, the target D2D user equipment transmits a D2D indicator through PUCCH and is then able to transmit information such as a presence or non-presence of ACK/NACK for the D2D transmission, a D2D trouping/pairing ID, a device ID of source (e.g., STID, C-RNTI, etc.) and the like to the base station through PUSCH matching the PUCCH. In doing so, it is able to define and use D2D PUCCH format (PUCCH format 4a) for the transmissions of a d2d ACK/NACK indicator or D2D transmission indicator through PUCCH of the target D2D user equipment, information (e.g., start point (time/frequency), RB index, etc.) on the PUSCH of the target D2D user equipment, and the like.

Having received a presence or non-presence of ACK/NACK for the D2D data transmission from the target D2D user equipment, the base station indicates the ACK/NACK information to the source D2D user equipment [S450]. Hence, the source D2D user equipment is able to receive the ACK/NACK for the data transmission to the target D2D user equipment through a downlink frame from the base station [S450]. In the following description, a method for the base station to transmit ACK/NACK for the D2D data transmission to the source D2D user equipment is explained in detail.

<Transmission of ACK/NACK Signal on UE-Specific D2D PDCCH>

A base station is able to transmit an ACK/NACK signal on a UE-specific D2D PDCCH for a D2D user equipment. In this case, the ACK/NACK signal for a D2D link transmitted to a source D2D user equipment by the base station may include the meaning that indicates whether to make a new data request (NDR). For instance, the base station sets the NDR to '1' to transmit ACK to the source D2D user equipment and then transmits the ACK, thereby instructing the meaning of requesting to transmit a new data to the source D2D user equipment. For another instance, the base station sets the NDR to '0' to transmit NACK to the source D2D user equipment and then transmits the NACK, thereby instructing the source D2D user equipment to perform a retransmission. In this case, the NDR value setting may be opposite to the former setting. Moreover, in case of performing the D2D transmission, the NDR can be substituted with a new data indicator (NDI) transmitted on PDCCH.

<Transmission of ACK/NACK Signal Using Data Channel>

The base station is able to transmit the ACK/NACK signal to the source D2D user equipment together with the D2D indicator (i.e., the indicator indicating the D2D data transmission) using a data channel (e.g., PDSCH in LTE) [S450]. In doing so, the D2D indicator and the ACK/NACK signal can be transmitted by being masked with an identifier (e.g., C-RNTI (cell-radio network temporary identity)/D2D ID) of the source D2D user equipment. If so, the base station decodes the masked identifier of the D2D user equipment and is able to recognize that it is transmitted by a corresponding target D2D user equipment having the corresponding D2D identifier.

<Transmission of ACK/NACK Signal Using DL HARQ Channel>

A base station transmits a presence or non-presence of the ACK/NACK received from a target D2D user equipment to a source D2D user equipment through a DL HARQ channel (e.g., PHICH in LTE system).

Figure 5:
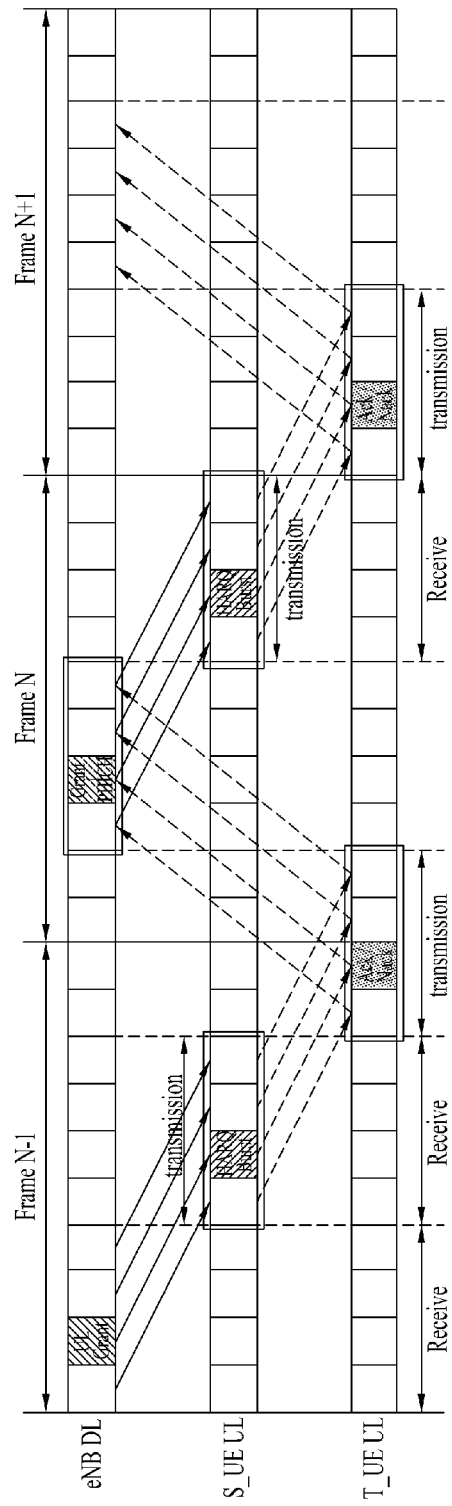
FIG. 5 is a diagram for one example of a frame structure to describe an ACK/NACK signal transmitting method using a DL HARQ channel.

FIG. 5 is a diagram for one example of a frame structure to describe an ACK/NACK signal transmitting method using a DL HARQ channel.

Referring to FIG. 5, if a base station transmits a UL grant 510 to D2D user equipments in frame N−1, a source D2D user equipment transmits D2D data on a resource allocated by the UL grant. If so, a target D2D user equipment transmits an ACK/NACK signal for a D2D data transmission of the source D2D user equipment to the base station. In doing so, ACK/NACK signal is transmitted. In FIG. 5, each of a relation between a UL grant transmission subframe and a D2D data transmission subframe according to UL grant and a relation between a D2D data transmission frame and an ACK/NACK signal transmission sub frame for a D2D data transmission has a subframe index difference set to 4 (n, n+4), by which the subframe index difference is non-limited. As mentioned in the foregoing description, in FIG. 5, When a D2D transmission is performed, a base station considers 'processing time=4' for an HARQ processing according to an ACK/NACK transmission. Hence, if the source D2D user equipment transmits PUSCH of $n^{th}$ subframe to the target D2D user equipment, PHICH transmitted to the source D2D user equipment by the base station is transmitted in a subframe corresponding to 'n+KPHICH'. In this case, KPHICH may be defined as 8 for example.

Like the example shown in FIG. 5, each of the source and target D2D user equipments performing the D2D receives a UL grant containing information on a channel or resource for a D2D data transmission and an ACK/NACK transmission in a downlink subframe. In particular, the UL grant for the D2D transmission can be transmitted to the D2D user equipment through the downlink sub frame in each subframe, as shown in FIG. 5, for a flexible scheduling. And, the UL grant can be transmitted to the D2D user equipment through the downlink subframe in order to reduce frequent UL grant transmissions/receptions for a D2D transmission only if initiating a D2D transmission or performing a new data transmission. Hence, the base station transmits the UL grant for the D2D to the D2D user equipment through persistence or semi-persistence scheduling. The D2D user equipment then transmits the D2D transmission and the ACK/NACK signal using the channel or resource allocated through the received UL grant until the D2D transmission is completed. In doing so, in order to receive a new UL grant, the D2D user equipment may be able to transmit a new D2D data transmission indicator or a D2D transmission complete indicator to the base station.

In order to transmit a presence or non-presence of ACK/NACK for a D2D transmission, a base station can configure D2D PHICH. In this case, the D2D PHICH can be transmitted through a $2^{nd}$ symbol of a $1^{st}$ slot in a subframe for example. Configuration information on the D2D PHICH can be transmitted to a D2D user equipment on a broadcast channel (e.g., PBCH).

A base station can transmit ACK/NACK for a D2D data transmission by forming a PHICH group. In this case, the PHICH group for the D2D transmission ACK/NACK transmission is used by designating one of existing PHICH groups or forming a D2D dedicated PHICH group.

A resource for PHICH for transmitting ACK/NACK for D2D link can be indicated by an RB index of PUSCH for a D2D user equipment to transmit data and an orthogonal sequence index (or a cyclic shift value) for identifying PHICHs of user equipments in a group.

Having received a presence or non-presence of ACK/NACK for a D2D transmission from a base station, a source D2D user equipment performs a new data transmission if receiving the ACK or performs a retransmission if receiving the NACK. In this case, it may be able to determine the new data transmission using an HARQ process number for receiving a downlink signal transmitted by the base station, an NDI or the like.

Direct ACK/NACK Transmission Scheme between D2D User Equipments for D2D Link

Unlike the former transmission of the ACK/NACK Signal for the D2D transmission though the base station, a D2D user equipment is able to transceive ACK/NACK signal between D2D user equipments in direct through a D2D link.

Figure 6:
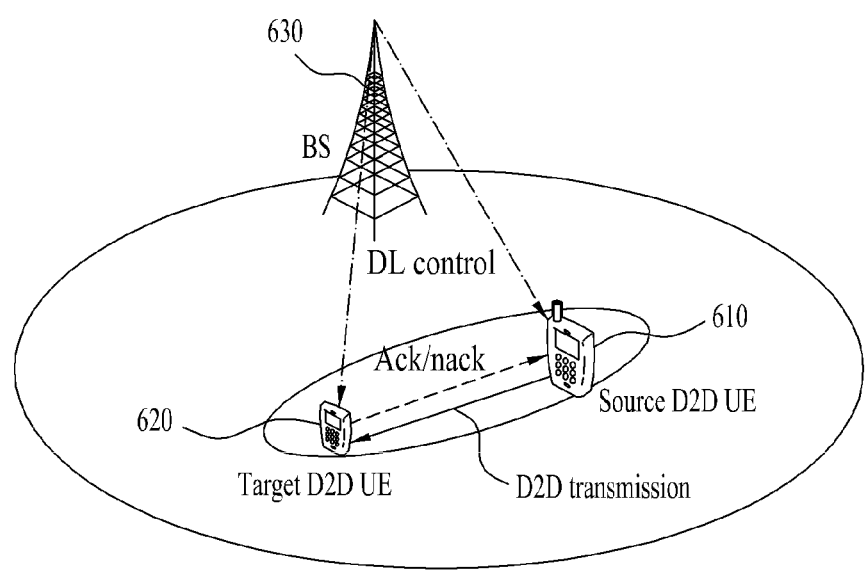
FIG. 6 is a diagram for one example to describe a direct ACK/NACK signal transceiving method for a data transmission between D2D user equipments.

FIG. 6 is a diagram for one example to describe a direct ACK/NACK signal transceiving method for a data transmission between D2D user equipments.

Referring to FIG. 6, each of D2D user equipments 610 and 620 connected or paired with each other for performing a D2D communication in a cell receives an information (D2D information) for the D2D communication in a downlink sub frame from a base station 630. In doing so, the D2D information transmitted by the base station 630 can be individually transmitted as a unicast signal to each D2D user equipment or can be broadcasted as a multicast signal to the D2D user equipment. For instance, in case of LTE system, the D2D information may be transmitted on PDCCH or PDSCH. In doing so, in case that the D2D information is transmitted on PDSCH together with data, it is able to transmit an indicator, which indicates that the D2D information is transmitted on PDSCH, to the D2D user equipment through PDCCH in order to indicate that the D2D information is transmitted.

The D2D information can be transmitted by containing the following information.

Resource allocation information (uplink frame)

D2D frame configuration information (1. transmitting/receiving zone information: transmitting/receiving zone ratio, length, number of transmitting/receiving zone symbol/slot/subframe), 2. Transmitting/receiving switching information, gap information (location of gap, slot or symbol number of gap), 3. Start point (slot/subframe/frame index))

Reference signal information (including pilot pattern, cyclic shift value, sequence index value, etc.)

Having received the D2D information from the base station 630, the source D2D user equipment 610 transmits data to the target D2D user equipment 620 through D2D using the allocated resource and the reference signal. A transmission scheme of ACK/NACK signal of the target D2D user equipment for the data transmitted by the source D2D user equipment 610 can be represented as shown in FIG. 7.

Figure 7:
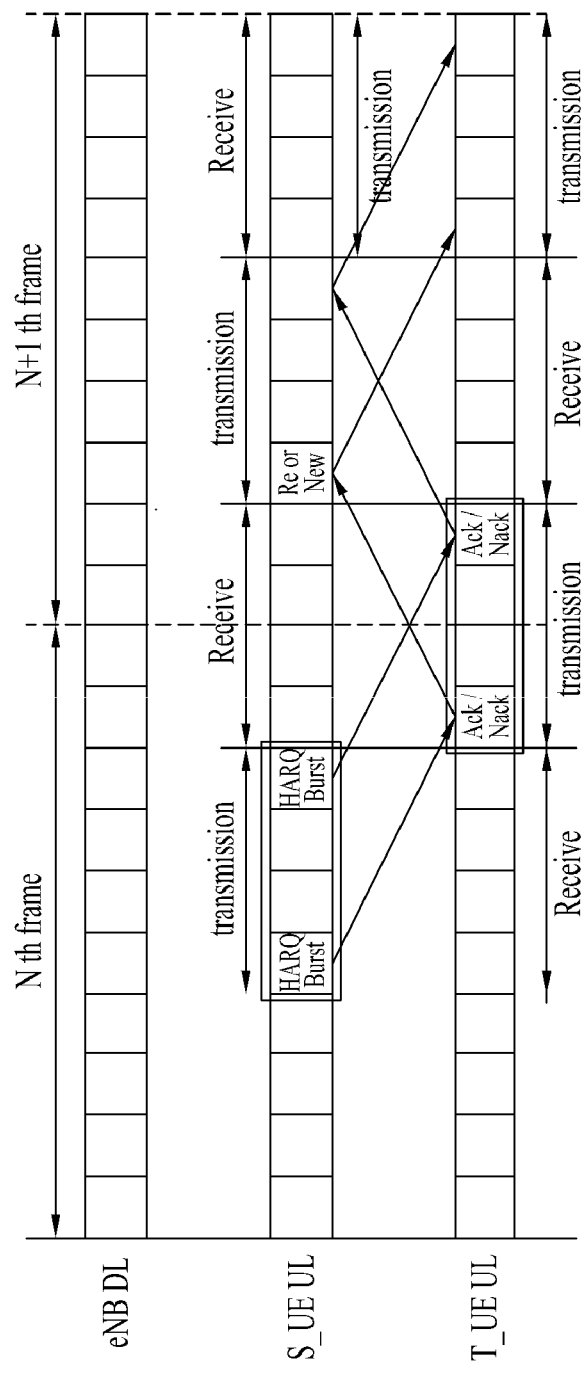
FIG. 7 is a diagram for one example of a frame structure to describe a direct ACK/NACK transmission scheme between D2D user equipments for a D2D link.

FIG. 7 is a diagram for one example of a frame structure to describe a direct ACK/NACK transmission scheme between D2D user equipments for a D2D link.

FIG. 7 shows HARQ timing for transmitting direct ACK/NACK between D2D user equipments. Like the example shown in FIG. 7, each of source and target D2D user equipments having received D2D information from a base station through PDCCH or PDSCH performs a D2D transmission in consideration of a processing time (4 subframes) for a downlink signal. Hence, referring to FIG. 7, if a D2D information is received through a $1^{st}$ subframe of an $N^{th}$ subframe, a D2D transmission is performed from a $4^{th}$ uplink subframe. A base station transmits information on a D2D transmission start time in consideration of the processing time for the downlink signal, thereby enabling the D2D transmission to start not from $N^{th}$ frame but from (N+1)th frame.

Like the example shown in FIG. 7, having received the D2D information through the $1^{st}$ subframe of the Nth frame from the base station, the two D2D user equipments perform the D2D communication using the received information. In doing so, the source D2D user equipment starts the data transmission from an uplink subframe index 4 (UL SF #4) of the $N^{th}$ frame in consideration of the processing on the received D2D information. And, the target D2D user equipment transmits D2D control information and data on PUCCH and PUSCH in UL SF #8. Hence, it is able to define and use a new PUCCH format (e.g., a format for D2D) for the D2D communication.

In the above description, the information transmitted on PUCCH by the target D2D user equipment may include the following.

HARQ process index
New data indicator (NDI)
Transmission power, power boosting
Pilot pattern, cyclic shift value
DD communication indicator
D2D ID, D2D paring ID, or D2D group ID Having received the control information and data through PUCCH and PUSCH, the target D2D user equipment transmits ACK/NACK signal for the received data to the source D2D user equipment through PUCCH or PUSCH. In this case, the ACK/NACK for the D2D transmission data received by the target D2D user equipment through PUCCH is transmitted using an existing PUCCH format. For instance, only ACK/NACK signal is transmitted through PUCCH format 1a or PUCCH format 1b, or a channel quality information on the D2D transmission and the ACK/NACK signal can be transmitted through PUCCH format 2a/2b.

Unlike transmitting ACK/NACK signal using PUCCH format in an existing cellular network, ACK/NACK for the received data can be transmitted to the source D2D user equipment using PUCCH format 4a/4b newly designed for the D2D transmission.

Unlike the above description, the target D2D user equipment may be able to transmit ACK/NACK for D2D transmission data through PUSCH. In doing so, it is able to indicate that the ACK/NACK for the D2D transmission data is transmitted through PUCCH corresponding to the PUSCH. In this case, the information transmitted on PUCCH by the source D2D user equipment may include a D2D indicator (indicating that it is related to a D2D transmission), a source D2D user equipment ID, a target D2D user equipment ID, a pair/group ID of source and target D2D user equipments, and PUSCH assignment information (e.g., a start point, a length, etc.). In this case, the information transmitted on PUSCH may include ACK/NACK, HARQ processor number, CQI (channel quality information) and the like.

Thus, having received the ACK/NACK for the D2D transmission and the channel state information (e.g., CSI, CQI, etc.) through the PUCCH or PUSCH, the source D2D user equipment performs a retransmission or a new data transmission through the information. In particular, using the received CQI, the source D2D user equipment may be able to perform a D2D communication by configuring coding & modulation, MIMO, rank and the like to be appropriate for the D2D link.

According to the various embodiments mentioned in the foregoing descriptions, HARQ ACK/NACK signal for a data transmission between D2D user equipments is efficiently transmitted, whereby communication performance can be considerably enhanced.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of transmitting/receiving feedback information on D2D transmission data in a D2D (device to device) communication supportive wireless communication system and apparatus therefor are industrially applicable to various kinds of communication systems including 3GPP LTE, 3GPP LTE-A, IEEE 802 and the like.

What is claimed is:

1. A method of transmitting feedback information for D2D transmission data by a first D2D (device to device) user equipment in a wireless communication system supportive of a D2D communication, the method performed by the first D2D user equipment and comprising:
    establishing a D2D link with a second D2D user equipment through a D2D user equipment discovery;
    receiving, from a base station, D2D information including a resource allocation information for a D2D data transmission in the established D2D link;
    receiving, from the second D2D user equipment, data through a resource according to the resource allocation information, the second D2D user equipment is D2D-linked with the first D2D user equipment;
    transmitting, to the base station on an uplink control channel, a D2D indicator indicating that an ACK/NACK (acknowledgement/non-acknowledgement) signal for the data is related to the D2D communication; and
    transmitting, to the base station on an uplink data channel corresponding to the uplink control channel, the ACK/NACK signal and identifier information of the first D2D user equipment and second D2D user equipment,
    wherein the identifier information of the first D2D user equipment and the second D2D user equipment comprises one of:
        identifiers of the first D2D user equipment and the second D2D user equipment,
        a D2D link identifier of the first D2D user equipment and the second D2D user equipment, or
        a group identifier of the first D2D user equipment and second D2D user equipment.

2. A method of transmitting a feedback for D2D transmission data by a base station in a wireless communication system supportive of a D2D (device to device) communication, the method performed by the base station and comprising:
    receiving, from a first D2D user equipment, an ACK/NACK (acknowledgement/non-acknowledgement)

signal for data, which is received by the first D2D user equipment from a D2D-linked second D2D user equipment,
wherein the second D2D user equipment is D2D-linked with the first D2D user equipment;
transmitting, to the second D2D user equipment on an downlink control channel, a D2D indicator indicating that the received ACK/NACK signal is related to the D2D communication; and
transmitting, to the second D2D user equipment on an downlink data channel corresponding to the downlink control channel, the received ACK/NACK signal and identifier information of the first D2D user equipment and the second D2D user equipment,
wherein the identifier information of the first D2D user equipment and the second D2D user equipment comprises one of:
identifiers of the first D2D user equipment and the second D2D user equipment,
a D2D link identifier of the first D2D user equipment and the second D2D user equipment, or
a group identifier of the first D2D user equipment and second D2D user equipment.

3. The method of claim 2, wherein the ACK signal is transmitted as an indicator indicating a new data transmission and wherein the NACK signal is transmitted as an indicator indicating a retransmission of the data.

4. A first D2D (device to device) user equipment for transmitting feedback information on a D2D transmission data in a wireless communication system supportive of a D2D (device to device) communication, the first D2D user equipment comprising:
a transmitter;
a receiver; and
a processor, wherein the processor is configured to:
establish a D2D link with a second D2D user equipment through a D2D user equipment discovery,
control the receiver to receive D2D information including a resource allocation information for a D2D data transmission from a base station in the established D2D link and receives data from the second D2D user equipment through a resource according to the resource allocation information, and
control that the transmitter to:
transmit, to the base station on an uplink control channel, a D2D indicator indicating that an ACK/NACK (acknowledgement/non-acknowledgement) signal for the data is related to the D2D communication, and
transmit, to the base station on an uplink data channel corresponding to the uplink control channel, the ACK/NACK signal and identifier information of the first D2D user equipment and second D2D user equipment,
wherein the identifier information of the first D2D user equipment and the second D2D user equipment comprises one of:
identifiers of the first D2D user equipment and the second D2D user equipment,
a D2D link identifier of the first D2D user equipment and the second D2D user equipment, or
a group identifier of the first D2D user equipment and second D2D user equipment.

5. A base station for transmitting feedback information on a D2D transmission data in a wireless communication system supportive of a D2D (device to device) communication, the base station comprising:
a transmitter;
a receiver; and
a processor, wherein the processor is configured to:
control the receiver to receive, from a first D2D user equipment, an ACK/NACK (acknowledgement/non-acknowledgement) signal for data, which is received by the first D2D user equipment from a D2D-linked second D2D user equipment,
wherein the second D2D user equipment is D2D-linked with the first D2D user equipment, and
control the transmitter to:
transmit, to the second D2D user equipment on an downlink control channel, a D2D indicator indicating that the received ACK/NACK signal is related to the D2D communication, and
transmit, to the second D2D user equipment on an downlink data channel corresponding to the downlink control channel, the received ACK/NACK signal and identifier information of the first D2D user equipment and the second D2D user equipment,
wherein the identifier information of the first D2D user equipment and the second D2D user equipment comprises one of:
identifiers of the first D2D user equipment and the second D2D user equipment,
a D2D link identifier of the first D2D user equipment and the second D2D user equipment, or
a group identifier of the first D2D user equipment and second D2D user equipment.

* * * * *